United States Patent Office 2,964,554
Patented Dec. 13, 1960

2,964,554

4-MONOBENZOATE OF 2,4-DIHYDROXY-BENZOPHENONE

Carl B. Havens and Gerald A. Clark, Midland, Mich., assignors to The Dow Chemical Company, Midland, Mich., a corporation of Delaware No Drawing. Filed Sept. 19, 1958, Ser. No. 761,918

1 Claim. (Cl. 260—476)

This invention relates to the novel compound 2,4-dihydroxybenzophenone-4-monobenzoate. The novel compound corresponds to the formula:

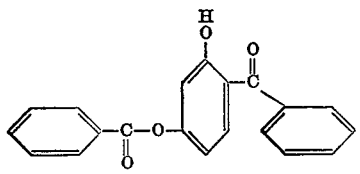

This compound finds utility as a parasiticide and insecticide. The compound finds further utility as an additament to compositions based upon polymeric materials and particularly haloethylenically polymeric materials. In this latter capacity is functions to stabilize the composition to the degradative effects of light. By haloethylenic polymers it is meant to include the polymers and copolymers of vinyl chloride and of vinylidene chloride polymerized alone, with each other or with another monoethylenically unsaturated comonomer, such as vinyl acetate, acrylonitrile, the alkyl acrylates, alkyl methacrylates and like comonomers.

The present compound is conveniently prepared according to the following representative procedure. The ester is prepared by the dropwise addition of 0.5 mole of benzoyl chloride to 0.5 mole of monobenzoyl resorcinol dissolved in 500 milliliters of toluene and 75 milliliters of pyridine at room temperature. Reaction is allowed to proceed for two hours at 75° C. The product is recovered by washing with 5 percent aqueous sodium bicarbonate, followed by water washing, then by devolatilization of the solvent at 100 millimeters mercury, and finally by recrystallization from ethanol. The compound as thus prepared is characterized as a yellow crystalline product having a melting point of 94.5 to 95.5° C. The compound is further characterized by being soluble in many common organic solvents such as methanol and acetone and of having very limited solubility in water.

The present compound is useful as an insecticide and herbicide, and is especially adapted to be employed in the control of intestinal parasites of warm blooded animals. For such use the unmodified compound may be employed. In an alternative procedure, the compound may be dispersed upon an inert finely divided solid and the resulting preparations employed, for oral administration, as feed additives, or enclosed in a capsule or compressed to form a bolus. Also, such preparations may be dispersed in water with or without a wetting or dispersing agent, and the resulting aqueous dispersion employed as oral drenches or in drinking water. In a representative operation the feeding in unrestricted quantity of a balanced commercial laboratory animal diet modified by the inclusion therein of the present compound in the concentration of 0.25 percent by weight of total diet over a period of 7 days to mice parasitized by *Ascaris lumbricoides suum*, mouse, pinworms, and Hymenolepis spp. gave a 100 percent kill of the parasites.

This application is a continuation-in-part of U.S. Serial No. 544,819, filed November 3, 1955, by Carl B. Havens and Gerald A. Clark, now abandoned.

What is claimed is:

2,4 - dihydroxybenzophenone-4-monobenzoate characterized as a crystalline solid melting at 94.5 to 95.5° C.

References Cited in the file of this patent

Amin et al.: J. Indian Chem. Soc., 25, 378–9 (1948).